United States Patent
McNeil et al.

(10) Patent No.: US 6,352,874 B1
(45) Date of Patent: Mar. 5, 2002

(54) METHOD OF MANUFACTURING A SENSOR

(75) Inventors: Andrew C. McNeil, Scottsdale; David J. Monk, Mesa; Bishnu P. Gogoi, Scottsdale, all of AZ (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/317,734

(22) Filed: May 24, 1999

(51) Int. Cl.$^7$ ............................................... H01L 21/28
(52) U.S. Cl. ...................................... 438/53; 438/251
(58) Field of Search ................. 438/53, 694, FOR 412, 438/FOR 438, FOR 385, 251, FOR 388; 148/DIG. 73

(56) References Cited

U.S. PATENT DOCUMENTS

| | | | |
|---|---|---|---|
| 4,665,610 A | * | 5/1987 | Barth |
| 5,316,619 A | * | 5/1994 | Mastrangelo |
| 5,332,469 A | * | 7/1994 | Mastrangelo |
| 5,431,057 A | | 7/1995 | Zimmer et al. |
| 5,471,723 A | * | 12/1995 | Luder et al. |
| 5,631,428 A | | 5/1997 | Catanescu et al. |
| 5,760,455 A | | 6/1998 | Hierold et al. |

FOREIGN PATENT DOCUMENTS

| | | |
|---|---|---|
| EP | 0810432 | 5/1997 |
| WO | 9823935 | 11/1997 |

OTHER PUBLICATIONS

T. Omi et al., "Capacitive Pressure Sensor with Center Clamped Diaphragm", IEICE Trans Electron, vol. E80–C, No. 2, Feb. 1997, pp. 263–268.

K. Shimaoka et al., "Micro–Diaphragm Pressure Sensor Using Polysilicon Sacrificial Layer Etch–Stop Technique", The 7$^{th}$ International Conference on Solid–State Sensors and Actuators—Digest of Technical Papers—Transducers '93, Jun. 7–10, 1993 (PACIFICO–Yokohama, Japan), pp. 632–635.

H. Dudaicevs, "A Fully Integrated Surface Micromachined Pressure Sensor with Low Temperature Dependence", The 8$^{th}$ International Conference on Solid–State Sensors and Actuators and Eurosensors IX, Digest of Technical Paper, Jun. 25–29, 1995, Stockholm, Sweden, vol. 1, Sessions A1–PD6, Papers No. 1–231, pp. 616–619.

* cited by examiner

*Primary Examiner*—George Fourson
*Assistant Examiner*—Michelle Estrada
(74) *Attorney, Agent, or Firm*—Robert L. King

(57) ABSTRACT

A method of manufacturing a sensor includes forming a first electrode (120, 1120), forming a sacrificial layer (520) over the first electrode, and forming a layer (130) over the sacrificial layer where a second electrode (131, 831) is located in the layer. The method further includes removing the sacrificial layer after forming the layer to form a cavity (140) between the first and second electrodes and then sealing the cavity between the first and second electrodes. The layer is supported over the first electrode by a post (133, 833) in the cavity, and the second electrode is movable relative to the first electrode and is movable in response to a pressure external to the cavity.

19 Claims, 5 Drawing Sheets

METHOD OF MANUFACTURING A SENSOR

BACKGROUND OF THE INVENTION

This invention relates, in general, to electronics, and more particularly, to methods of manufacturing sensors.

Many absolute pressure sensors use two parallel capacitive plates to measure a pressure where a higher pressure deflects a movable capacitive plate closer to a stationary capacitive plate. However, these sensors suffer from a non-linearity error where the movable capacitive plate is deformed in a non-l near manner by the measured pressure such that the movable capacitive plate is no longer substantially parallel to the stationary capacitive plate. The resulting non-linearity error produces an inaccurate measurement of the pressure.

"One technique to reduce the non-linearity error is to increase the thickness of the movable capacitive plate or to place additional support layers over or under the movable capacitive plate. However, the increased thickness of the movable plate produces problems when integrating the sensor onto a complimentary metal-oxide-semiconductor (CMOS) chip."

Another technique to reduce the non-linearity error is to reduce the size of the movable capacitive plate. However, the reduced size decreases the capacitance, which reduces the sensitivity of the sensor. To compensate for the reduced capacitance, an array of small, independently movable capacitive plates can be used where each of the movable capacitive plates is anchored to a support substrate that also supports the stationary capacitive plate. However, the parasitic capacitance of the sensor is significantly magnified by the increased number of anchors in the array of sensors, and this increased parasitic capacitance produces other problems in measuring the pressure.

Still another technique to reduce the non-linearity error is to use additional circuitry to compensate for the error. However, the additional circuitry increases the size and cost of the completed sensor.

Yet another technique to reduce the non-linearity error allows the movable capacitive plate to "touch down" or contact the stationary capacitive plate. While this technique has been reported to produce more linear electrical characteristics, this technique suffers from a hysteresis effect. Moreover, the movable capacitive plate in this "touch down" technique suffers from material fatigue problems.

Accordingly, a need exists for a method of manufacturing a sensor that can eliminate, or at least reduce, the magnitude of the non-linearity error while the sensor remains integratable on-chip with control circuitry, while maintaining the sensitivity of the sensor, while minimizing the parasitic capacitance, while maintaining reliability, without introducing hysteresis effects or material fatigue problems, and without increasing the cost of the sensor component by requiring additional compensation circuitry.

Figure 1:
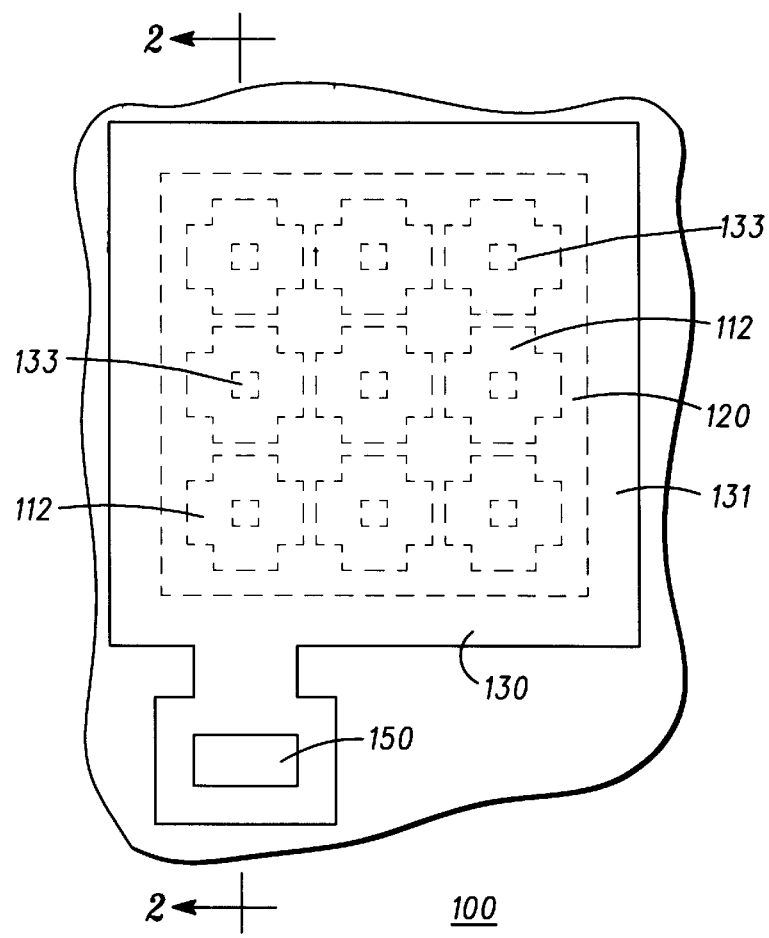
FIG. 1 illustrates a top view of a portion of an embodiment of a sensor in accordance with the present invention.

For simplicity and clarity of illustration, elements in the drawings are not necessarily drawn to scale, and the same reference numerals in different figures denote the same elements. Additionally, descriptions and details of well-known features and processing techniques are omitted to avoid unnecessarily obscuring the present invention.

DETAILED DESCRIPTION OF THE DRAWING

Figure 2:
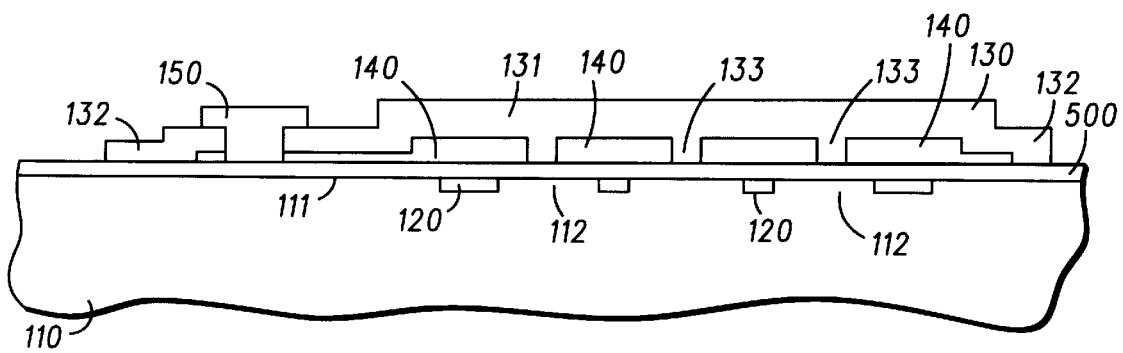
FIG. 2 illustrates a cross-sectional view of the portion of the sensor of FIG. 1 taken along a section line 2—2 in FIG. 1 in accordance with the present invention.

FIG. 1 illustrates a top view of a portion of a sensor 100, and FIG. 2 illustrates a cross-sectional view of the portion of sensor 100 taken along a section line 2—2 in FIG. 1. Sensor 100 is a capacitive pressure sensor having electrodes 120 and 131 that form parallel capacitive plates in sensor 100. A hermetically sealed cavity 140 having an absolute pressure is located between electrodes 120 and 131.

Electrode 131 is formed in or from a layer 130 that serves as a flexible or deformable diaphragm or membrane for sensor 100. The flexibility of layer 130 permits electrode 131 to bend or deflect towards electrode 120 when a pressure external to cavity 140 impacts layer 130 and when the pressure is greater than the pressure within cavity 140. The deflection of electrode 131 toward electrode 120 changes the capacitance of sensor 100, and the change in capacitance provides a measurement of the change in external pressure. Other aspects of sensor 100 will be discussed hereinafter.

Figure 3:
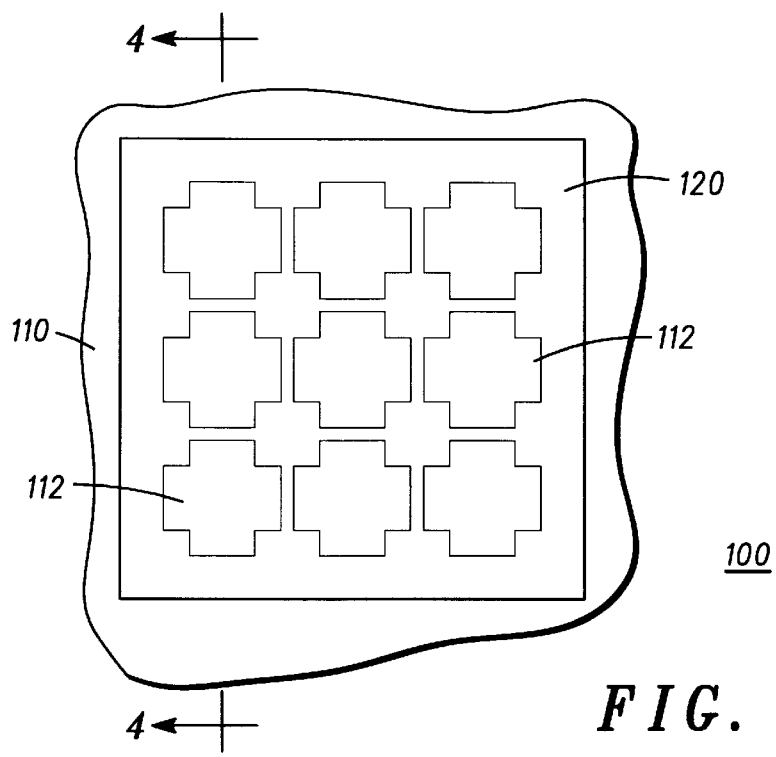
FIG. 3 illustrates a top view of the portion of the sensor of FIG. 1 after several initial manufacturing steps in accordance with the present invention.
Figure 4:
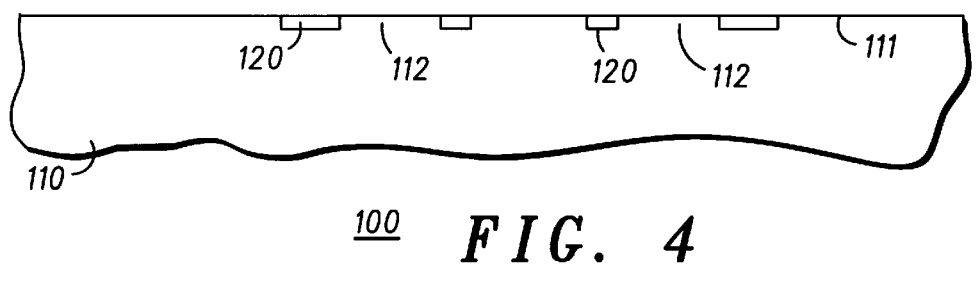
FIG. 4 illustrates a cross-sectional view of the portion of the sensor of FIG. 3 taken along a section line 4—4 in FIG. 3 in accordance with the present invention.

FIG. 3 illustrates a top view of the portion of sensor 100 after several initial manufacturing steps, and FIG. 4 illustrates a cross-sectional view of the portion of sensor 100 taken along a section line 4—4 in FIG. 3. FIGS. 3 and 4 illustrate sensor 100 after electrode 120 is formed into a surface 111 of substrate 110. In the preferred embodiment, substrate 110 is comprised of a semiconductor material such as, for example, crystalline silicon, and electrode 120 is formed by implantation, diffusion, or both implantation and diffusion into surface 111 of substrate 110. Accordingly, electrode 120 is also preferably comprised of crystalline silicon. Electrode 120 is patterned or formed into substrate 110 such that electrode 120 has at least one hole. Other portions 112 of substrate 110 that are not used to form electrode 120 are located in the hole or holes within electrode 120. In FIG. 3, electrode 120 is illustrated to have nine holes, three of which are illustrated in cross-sectional view in FIG. 4.

Figure 5:
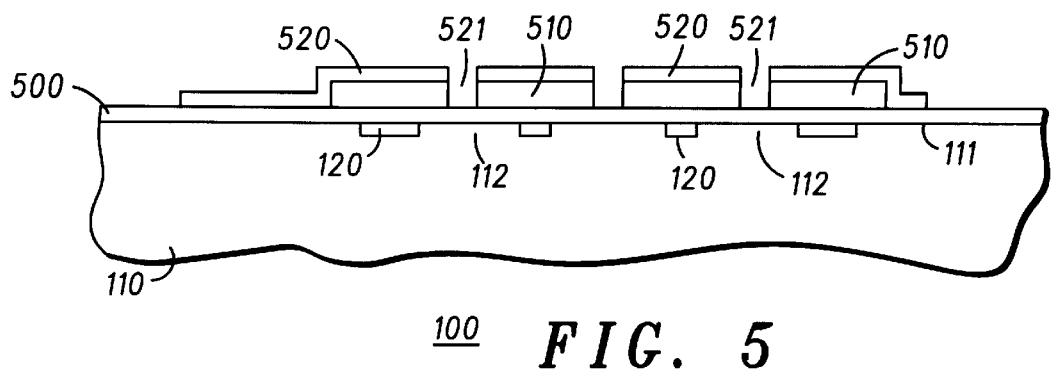
FIGS. 5–7 illustrate cross-sectional views of the portion of the sensor after subsequent manufacturing steps in accordance with the present invention.

FIG. 5 illustrates a cross-sectional view of the portion of sensor 100 after subsequent manufacturing steps. A protective layer 500 can be deposited over surface 111 of substrate 110 and over electrode 120 to protect substrate 110 and electrode 120 from a subsequent etchant used to remove a subsequently formed sacrificial layer and to form cavity 140 (see FIG. 2). As an example, layer 500 can have a thickness of approximately 0.2–0.5 micrometers and can be comprised of silicon nitride or a low stress nitride when the sacrificial layer is comprised of an oxide and is removed using a hydrofluoric-based wet etchant.

Next, sacrificial layers 510 and 520 are sequentially formed and patterned over layer 500. As an example, layers 510 and 520 can each be comprised of a layer of phosphosilicate glass. Layers 510 and 520 can have a combined thickness of approximately 0.5–2 micrometers. Preferably, layer 520 is five to ten times thinner than layer 510 to improve the robustness of the cavity sealing process described hereinafter. Layers 510 and 520 have at least one hole 521 extending therethrough to expose underlying portions of layer 500 and preferably has at least as many holes as electrode 120 where each hole in electrode 120 is preferably covered by or concentric with a different hole in layer 520. Layer 520 is preferably patterned before holes 521 are formed into layers 510 and 520.

Figure 6:
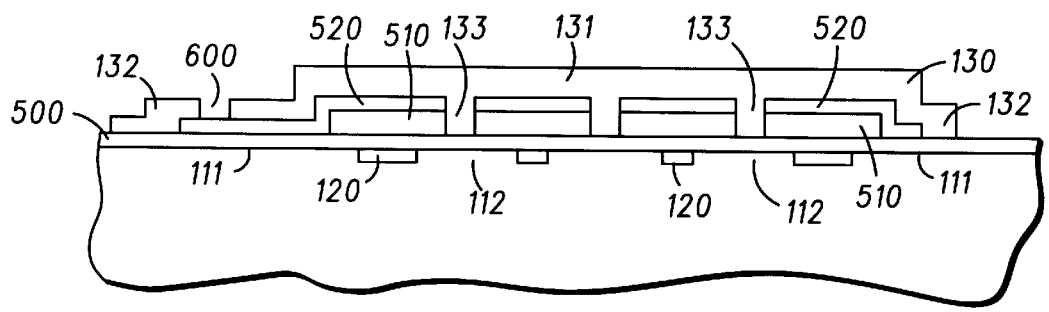

FIG. 6 illustrates a cross-sectional view of the portion of sensor 100 after additional manufacturing steps. Layer 130 is formed and patterned over sacrificial layers 510 and 520 and is formed in the holes of layer 520. Electrode 131 is formed or is located in a region of layer 130. In the preferred embodiment of sensor 100, layer 130 is formed by depositing one or more layers of uniformly doped polycrystalline silicon. In this preferred embodiment, electrode 131 is formed simultaneously with layer 130. However, layer 130 can be deposited undoped or merely lightly doped and then more heavily doped after being deposited, in which case electrode 131 is formed after layer 130.

A different region of layer 130 forms at least one pillar, support, or post 133 (FIG. 6) in hole 521 (FIG. 5) of layer 520. As illustrated in FIG. 6, each of the posts are preferably located entirely within the outer perimeters of electrodes 120 and 131 and are preferably devoid of directly overlying electrode 120. As explained hereinafter, the posts support electrode 131 over electrode 120. In the preferred embodiment, post 133 is also formed simultaneously with layer 130 and electrode 131.

Other regions or portions of layer 130 form anchors 132, which couple layer 130 to surface 111 of substrate 110. Portions of layer 500 are located between anchors 132 and surface 111 of substrate 110, and other portions of layer 500 are located between post 133 and surface 111 of substrate 110. Layer 500 improves the robustness of the coupling between layer 130 and substrate 110. The term coupled, as used herein, is defined as directly or indirectly connected in a mechanical or non-mechanical manner.

A hole 600 is etched into layer 130 during the patterning of layer 130. Hole 600 exposes a portion of underlying sacrificial layer 520. The purpose of hole 600 is explained hereinafter.

Figure 7:
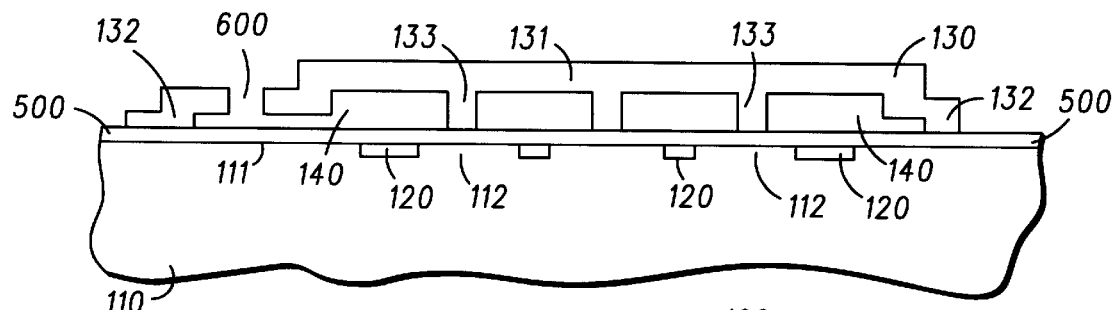

FIG. 7 illustrates a cross-sectional view of the portion of sensor 100 after further manufacturing steps. An etchant is used to remove sacrificial layers 510 and 520 through hole 600. It is understood that layer 130 can include a plurality of holes similar to hole 600 to facilitate the removal of sacrificial layers 510 and 520. Layers 510 and 520 are removed to form cavity 140 between electrodes 120 and 131. In sensor 100, cavity 140 is confined to a region below the second electrode and above surface 111 of substrate 110.

After the formation of cavity 140, layer 130 and electrode 131 become flexible and movable relative to substrate 110 and electrode 120. At least one post 133 remains in cavity 140 after the removal of the sacrificial layers to support electrode 131 over electrode 120. The posts add significant stiffness to the diaphragm and allow the use of thinner diaphragms for higher pressure ranges. These posts also change the shape of the deflected diaphragm to produce a smaller maximum deflection relative to the average deflection. In other words, the resulting diaphragm deflection is closer to the ideal "flat plate" model. The posts eliminate, or at least reduce, the amount of non-linear deformation of electrode 131 in response to the higher pressures external to cavity 140. Accordingly, the posts improve the measurement accuracy of sensor 100.

The specific number and configuration of the posts is dependent upon, among other factors, the magnitude of the pressure to be measured and the thickness of the diaphragm. More posts are needed when measuring higher pressures and when using a thinner diaphragm. As an example, when measuring pressures on the order of 100–700 kilopascals and when the minimum capacitance values are on the order of 100–700 femtoFarads and when the diaphragm is comprised of doped polycrystalline silicon, the diaphragm can be approximately 1–3 micrometers thick, approximately 150–300 micrometers wide, approximately 150–300 micrometers long. Under these conditions, the diaphragm can have 4–16 posts arranged in a square grid and spaced approximately 30–80 micrometers apart, and each post can be approximately 1–5 micrometers wide and approximately 1–4 micrometers tall. Without the use of the posts, the diaphragm thickness would need to be increased by approximately 2 to 3 times, which increases the difficulty and complexity of integrating a pressure sensor and an integrated circuit on the same substrate.

The number of posts used is preferably kept to a minimum, and the posts that are used are located over the holes in electrode 120 and are preferably devoid of covering or are absent over any portion of electrode 120. These features of the posts eliminate, or at least reduce, the amount of parasitic capacitance as compared to that in an array or grid of sensors.

Returning to FIG. 2, cavity 140 is subsequently hermetically sealed to form an evacuated cavity. Cavity 140 provides a reference for an absolute pressure measurement. An example of a suitable sealing process can involve the plasma-enhanced chemical vapor deposition of a layer of phosphosilicate glass in a vacuum chamber or the low pressure chemical vapor deposition of a layer of silicon nitride in a vacuum chamber. Alternatively, undoped silicate glass, tetraethylorthosilicate, polycrystalline silicon, a metal, evaporated or sputtered materials, or the like can be used for the sealing layer. The sealing layer can form a post 150 in hole 600 (see FIG. 7) and in cavity 140. Cavity 140 is easier to seal properly when post 150 is located over a portion of layer 130 that only overlaid the thinner of the two sacrificial layers. Other portions of the sealing layer can be subsequently removed to leave the configuration of post 150 illustrated in FIG. 2. After the formation of post 150, an additional sealing layer can optionally be used to reinforce or to ensure proper sealing of cavity 140.

Figure 8:
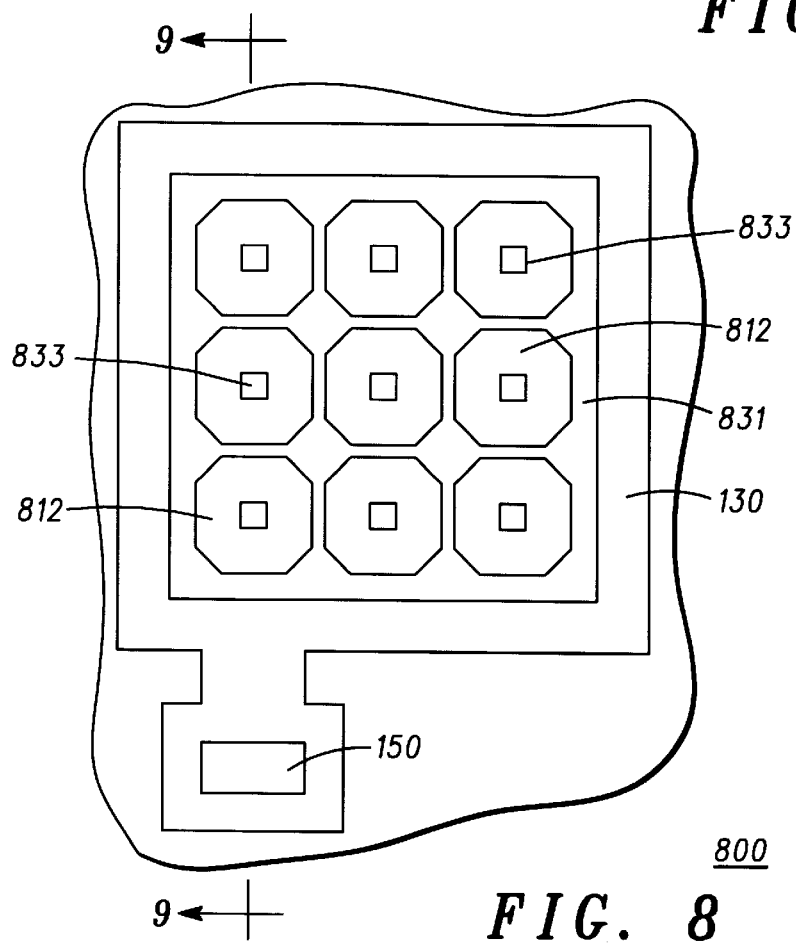
FIG. 8 illustrates a top view of a portion of another embodiment of a sensor in accordance with the present invention.
Figure 9:
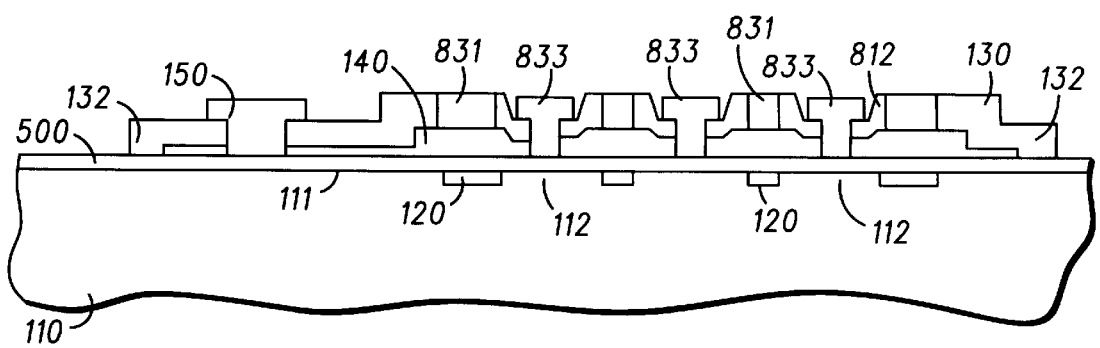
FIG. 9 illustrates a cross-sectional view of the portion of the sensor of FIG. 8 taken along a section line 9—9 in FIG. 8 in accordance with the present invention.

FIG. 8 illustrates a top view of a portion of a sensor 800, and FIG. 9 illustrates a cross-sectional view of the portion of sensor 800 taken along a section line 9—9 in FIG. 8. Sensor 800 is a different embodiment of sensor 100 (FIGS. 1 and 2). The diaphragm or layer 130 of sensor 800 in FIGS. 8 and 9 is selectively doped to form a patterned electrode 831. Layer 130 in sensor 800 is preferably comprised of undoped polycrystalline silicon, but may be comprised of lightly doped polycrystalline silicon. Electrode 831 has a similar function but a different configuration from electrode 131 of sensor 100 in FIGS. 1 and 2. For example, electrode 831 has a plurality of holes in which portions 812 of layer 130 are located. The holes in electrode 831 are located over or are concentric with the holes in electrode 120. Electrode 831 is preferably patterned into layer 130 before the sacrificial layer between layer 130 and substrate 110 is removed, but electrode 831 could alternatively be patterned into layer 130 after the sacrificial layers are removed.

Figure 10:
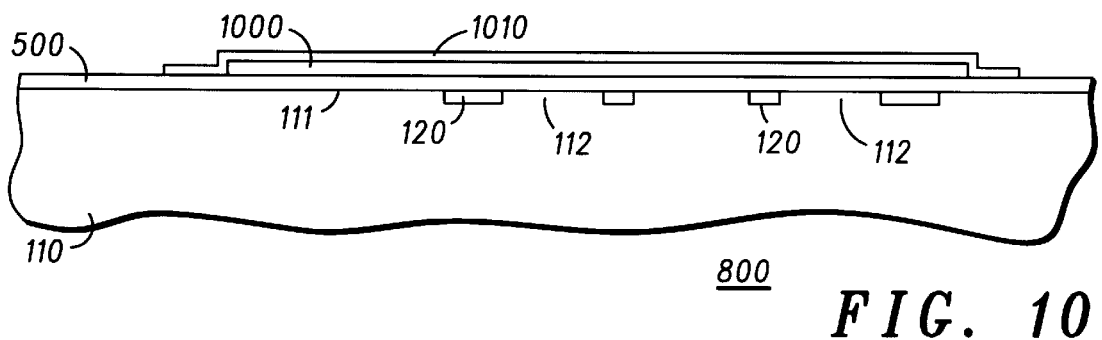
FIG. 10 illustrates a cross-sectional view of the portion of the sensor of FIG. 9 during an intermediate manufacturing step.

FIG. 10 illustrates sacrificial layers 1000 and 1010 used in sensor 800. Layer 1000 can be similar to layer 510 (FIG. 5), except that layer 1000 does not have any holes. Similarly, layer 1010 can be similar to layer 520 (FIG. 5), except that layer 1010 does not have any holes. After the formation of electrode 831 over layers 1000 and 1010, holes are etched into layer 130 to expose portions of sacrificial layer 1010 underlying layer 130. This etching step is similar to that described earlier in FIG. 7 for sensor 100, but this etching step for sensor 800 also forms additional holes in layer 130 that are located within the aforementioned holes of electrode 831. The holes etched into layer 130 are located over or are concentric with the holes of electrode 120 and 131. These additional holes in layer 130 facilitate the removal of the sacrificial layer to form cavity 140.

After its formation, cavity 140 (FIG. 9) of sensor 800 is sealed in a manner similar to that described earlier in FIG. 2 for sensor 100. During this sealing process for sensor 800, post 150 is formed as described in FIG. 2, and pillars, supports, or posts 833 are simultaneously formed with post 150. Similar to post 150, posts 833 are located within cavity 140 and seal the holes in layer 130. Posts 833 in sensor 800 serve the same function as posts 133 of sensor 100 in FIG. 2. Accordingly, posts 833 support electrode 831 above electrode 120 to eliminate, or at least reduce, the magnitude of the non-linearity error of sensor 800 while minimizing the amount of additional parasitic capacitance. Posts 833 overlie or are concentric with the holes in electrode 120 and extend through the holes in layer 130. Furthermore, posts 833 are preferably located entirely within the outer perimeters of electrodes 120 and 831. Posts 833 are also preferably absent directly over electrode 120 and preferably absent directly under electrode 831.

Figure 11:
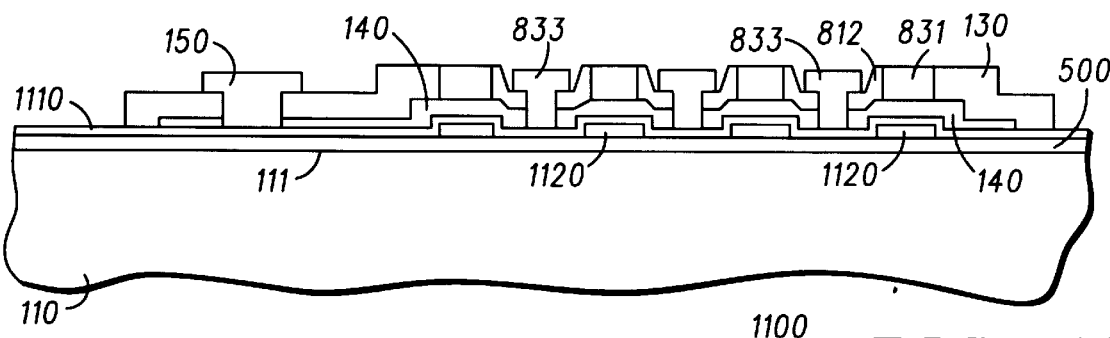
FIGS. 11–16 illustrate cross-sectional views of portions of other embodiments of a sensor in accordance with the present invention.

FIG. 11 illustrates a cross-sectional view of a portion of a sensor 1100, which is another embodiment of sensor 100 in FIG. 2. Sensor 1100 includes a diaphragm or layer 130 in which electrode 831 is formed and through which posts 150 and 833 are formed. However, sensor 1100 also includes an electrode 1120 that is formed over surface 111 of substrate 110, instead of being formed in surface 111 of substrate 110 as in sensor 100 (see FIG. 2). Electrode 1120 can be comprised of the same material as layer 130 and can be approximately 0.2–0.7 micrometers thick.

Figure 12:
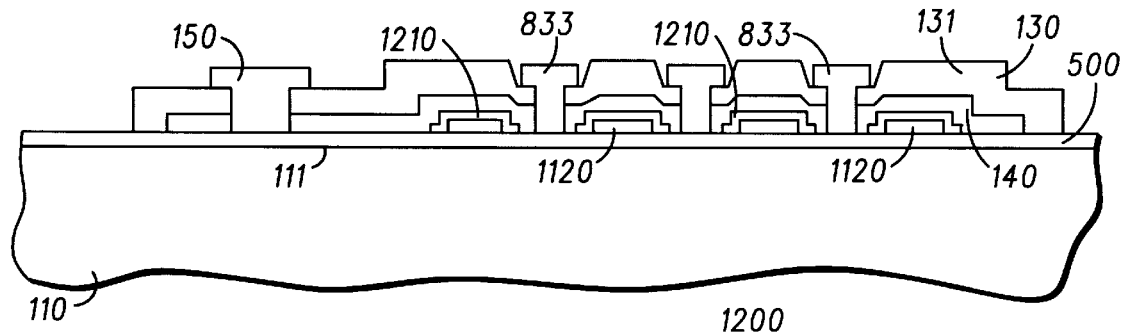
Figure 13:
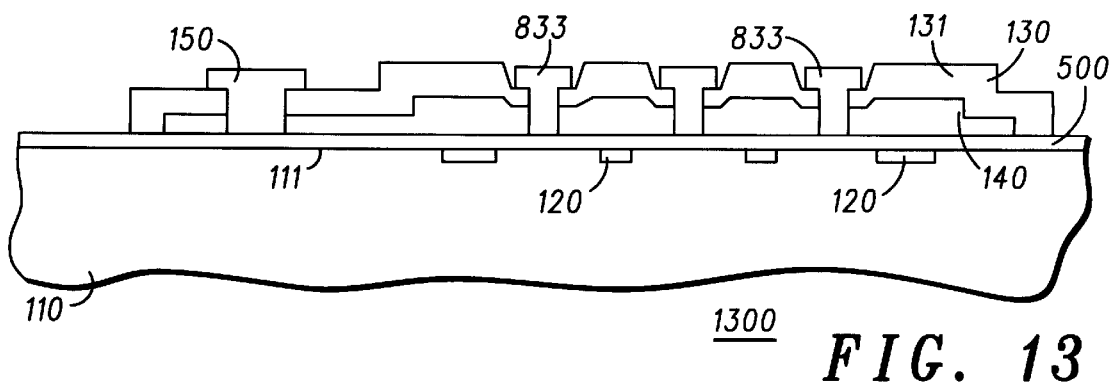
Figure 14:
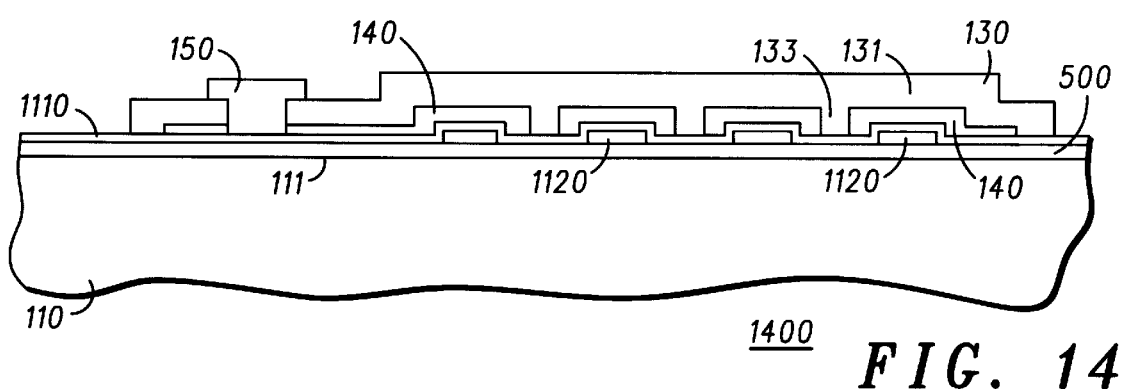
Figure 15:
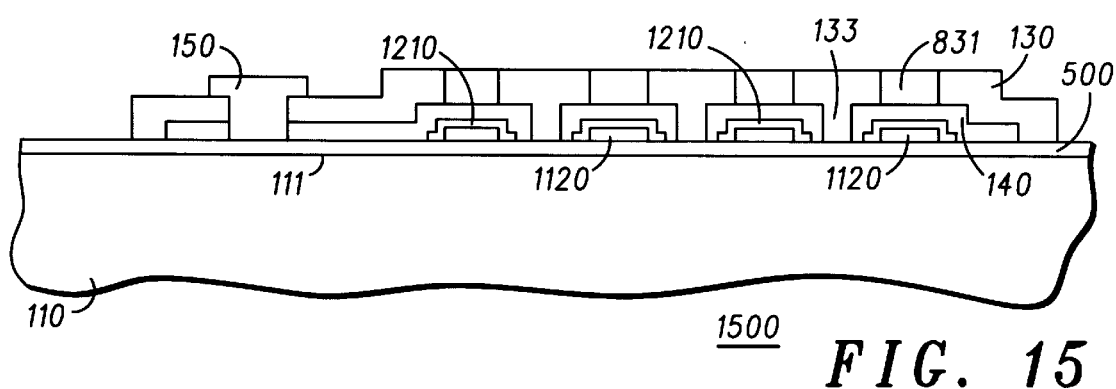
Figure 16:
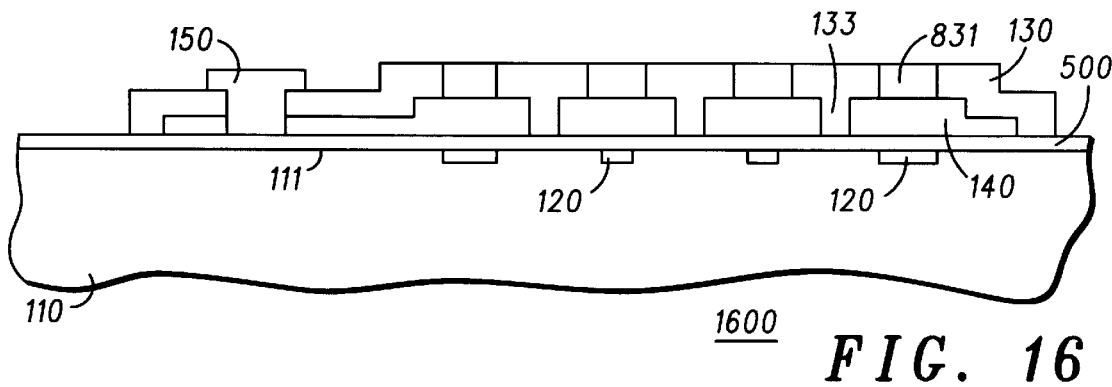

The remaining drawings illustrated various combinations of electrode 120 or 1120, electrode 131 or 831, and posts 133 or 833. For example, FIG. 12 illustrates a sensor 1200 having electrodes 131 and 1120 and posts 833. FIG. 13 illustrates a sensor 1300 having electrodes 120 and 131 and posts 833. FIG. 14 illustrates a sensor 1400 having electrodes 131 and 1120 and posts 133. FIG. 15 illustrates a sensor 1500 having electrodes 831 and 1120 and posts 133. FIG. 16 illustrates a sensor 1600 having electrodes 120 and 831 and posts 133. Posts 133 in FIGS. 15 and 16 may be slightly different than posts 133 of FIGS. 2 and 14 in that posts 133 of FIGS. 15 and 16 may be undoped because layers 130 in FIGS. 15 and 16 are only selectively doped while layers 130 in FIGS. 2 and 14 are preferably uniformly doped.

Therefore, an improved sensor and method of manufacture is provided to overcome the disadvantages of the prior art. The design or configuration of the sensor eliminates, or at least reduces, the magnitude of the non-linearity error of the sensor. This error elimination or reduction is accomplished while keeping the sensor compatible with the on-chip integration of control circuitry, while maintaining the sensitivity of the sensor, while minimizing the parasitic capacitance, while maintaining reliability, without introducing hysteresis effects or material fatigue problems, and without increasing the cost of the sensor component by requiring additional compensation circuitry.

All of the disclosed embodiments of the present invention described herein are enabled and can be realized and practiced without undue experimentation. Although the best mode of carrying out the present invention contemplated by the inventors is disclosed hereinabove, practice of the present invention is not limited thereto. Furthermore, while the present invention has been particularly shown and described mainly with reference to preferred embodiments, it will be understood by those skilled in the art that changes in form and detail may be made to the disclosure herein without departing from the spirit and scope of the present invention. For instance, the numerous details set forth herein such as, for example, the material compositions and layer thicknesses are provided to facilitate the understanding of the present invention and are not provided to limit the scope of the present invention. Furthermore, control circuitry for the sensor may be integrated on-chip onto or into substrate 110. Additionally, the flexible diaphragm and any holes in the diaphragm and in the electrode in the diaphragm can have a circular, triangular, square, rectangular, hexagonal, or any other suitable configuration. Similarly, the layout or arrangement of the posts are not limited to a square grid pattern, but can form an outline of a circle, a plurality of concentric circles, a rectangular grid, or other suitable layout. Moreover, electrodes 120 and 1020 can be comprised of a plurality of electrodes electrically coupled together by an interconnect layer. The interconnect layer can be the same layer as that used to form electrode 120, or the interconnect layer can be a separate layer from that used to form electrode 120. In yet another alternative embodiment, a single sacrificial layer or more than two sacrificial layers can be used.

Accordingly, the disclosure of the present invention is not intended to be limiting. Instead, the disclosure of the present invention is intended to be illustrative of the scope of the present invention, which is set forth in the following claims. The claims are not to be interpreted as including means-plus-function limitations, unless such a limitation is expressly recited in a given claim using the phrase "means for."

What is claimed is:

1. A method of manufacturing a sensor comprising:
   forming a first electrode having a first hole;
   forming a sacrificial layer over the first electrode, the sacrificial layer having a second hole overlying the first hole;
   forming a layer over the sacrificial layer, a second electrode located in the layer contemporaneous with forming a post in the second hole;
   removing the sacrificial layer after forming the layer to form a cavity between the first and second electrodes; and
   sealing the cavity between the first and second electrodes, the layer supported over the first electrode by the post, and the second electrode movable relative to the first electrode and movable in response to a pressure external to the cavity.

2. The method of claim 1 further comprising providing a substrate, wherein forming the first electrode further comprises forming the first electrode over the substrate.

3. The method of claim 2 wherein forming the first electrode further comprises forming the first electrode comprised of doped polycrystalline silicon, and wherein forming the layer further comprises forming the layer and the second electrode comprised of doped polycrystalline silicon.

4. The method of claim 1 further comprising providing a substrate comprised of crystalline silicon, and wherein forming the first electrode further comprises forming the first electrode in the substrate.

5. The method of claim 1 wherein forming the first electrode further comprises forming the first electrode comprised of crystalline silicon, and wherein forming the layer further comprises forming the layer and the second electrode comprised of polycrystalline silicon.

6. The method of claim 1 wherein forming the layer further comprises providing a portion of the layer in the first hole to form the post.

7. The method of claim 6 wherein forming the layer further comprises patterning the second electrode in the layer, the second electrode having a third hole overlying the post and overlying the first hole in the first electrode.

8. The method of claim 6 wherein forming the layer further comprises forming the post to overlie the first hole in the first electrode, to be absent directly over the first electrode, and to be absent directly under the second electrode.

9. The method of claim 1 wherein forming the layer further comprises providing the layer with a third hole overlying the first hole in the first electrode, and wherein sealing the cavity further comprises:

forming the post through the third hole in the layer; and sealing the third hole in the layer.

10. The method of claim 9 wherein forming the layer further comprises patterning the second electrode in the layer.

11. The method of claim 9 wherein forming the post further comprises forming the post to overlie the first hole in the first electrode, to be absent directly over the first electrode, and to be absent directly under the second electrode.

12. The method of claim 1 wherein sealing the cavity further comprises hermetically sealing the cavity.

13. The method of claim 9 wherein forming the post includes forming the post entirely within an outer perimeter of the first electrode, and entirely within an outer perimeter of the second electrode.

14. A method of manufacturing a pressure sensor comprising:

forming a first electrode with a first hole;

forming a sacrificial layer having a second hole over the first hole of the first electrode;

forming a layer over the sacrificial layer while concurrently forming a post within the second hole with the layer, a first region of the layer forming a second electrode and a second region of the layer forming the post;

removing the sacrificial layer to create a cavity between the first and second electrodes and wherein the post supports the second electrode over the first electrode; and hermetically sealing the cavity between the first and second electrodes, the cavity confined to a region below the second electrode.

15. The method of claim 14 further comprising providing a substrate, and wherein forming the first electrode further comprises forming the first electrode over the substrate.

16. The method of claim 14 further comprising providing a substrate, and wherein forming the first electrode further comprises forming the first electrode in the substrate.

17. The method of claim 14 wherein the post is absent over the first electrode and is located entirely within an outer perimeter of the first electrode and entirely within an outer perimeter of the second electrode.

18. The method of claim 14 wherein forming the layer further comprises patterning the layer to form the second electrode with a third hole located over the first hole of the first electrode and located over the post.

19. The method of claim 14 further comprising forming an additional sacrificial layer between the sacrificial layer and the layer wherein the additional sacrificial layer has a third hole concentric with the second hole in the sacrificial layer and wherein the additional sacrificial layer is thinner than the sacrificial layer.

* * * * *